United States Patent
Hatanaka et al.

(10) Patent No.: US 6,251,263 B1
(45) Date of Patent: Jun. 26, 2001

(54) PROCESS AND APPARATUS FOR HYDRODESULFURIZATION OF DIESEL GAS OIL

(75) Inventors: Shigeto Hatanaka, Yokohama; Osamu Sadakane, Tokyo; Hideshi Iki, Yokohama, all of (JP)

(73) Assignee: Nippon Mitsubishi Oil Corporation, Tokyo (JP)

( * ) Notice: Subject to any disclaimer, the term of this patent is extended or adjusted under 35 U.S.C. 154(b) by 0 days.

(21) Appl. No.: 09/377,089

(22) Filed: Aug. 19, 1999

(30) Foreign Application Priority Data

Oct. 5, 1998 (JP) .................................................. 10-282895

(51) Int. Cl.$^7$ .......................... C10G 65/04; C10G 45/04; B01J 8/04
(52) U.S. Cl. ..................... 208/210; 208/216 R; 208/217; 422/188; 422/190; 422/193
(58) Field of Search .............................. 208/210, 216 R, 208/217; 422/188, 190, 193

(56) References Cited

U.S. PATENT DOCUMENTS

| | | | |
|---|---|---|---|
| 3,239,453 | * 3/1966 | Halik et al. | 208/210 |
| 3,317,419 | * 5/1967 | Fortman | 208/97 |
| 3,696,027 | * 10/1972 | Bridge | 208/210 |
| 3,876,530 | * 4/1975 | Frayer et al. | 208/210 |
| 4,003,828 | 1/1977 | Eberly | 208/251 H |
| 4,054,508 | * 10/1977 | Milstein et al. | 208/89 |
| 4,306,964 | * 12/1981 | Angevine | 208/210 |
| 4,431,525 | * 2/1984 | Hensley, Jr. et al. | 208/210 |
| 4,657,663 | * 4/1987 | Gardner et al. | 208/210 |
| 4,797,195 | * 1/1989 | Kukes et al. | 208/59 |
| 4,959,140 | * 9/1990 | Kukes et al. | 208/59 |
| 5,187,133 | * 2/1993 | Yoshinari et al. | 502/66 |
| 5,292,428 | * 3/1994 | Harrison et al. | 208/208 R |
| 5,316,658 | 5/1994 | Ushio et al. | 208/216 R |
| 5,948,239 | * 9/1999 | Virdi et al. | 208/57 |

FOREIGN PATENT DOCUMENTS

| | | |
|---|---|---|
| 0 736 589 | * 10/1996 | (EP) . |
| 2267233 | * 12/1993 | (GB) . |
| 52-13503 | 2/1977 | (JP) . |
| 3-281596 | 12/1991 | (JP) . |
| 5-311179 | 11/1993 | (JP) . |
| 7-102266 | 4/1995 | (JP) . |
| 7-197039 | 8/1995 | (JP) . |

OTHER PUBLICATIONS

"Key Parameters in Deep Hydrodesulfurization of Diesel Fuel", F. van Looij, et al, Applied Catalysis A: General 170 (1998) 1–12.

"Catalysis Review", 24 (3), 343–345 (1982).

High Olefin Content May Limit Cracked Naphtha Desulfurization, D.P. Satchell, "The Oil and Gas Journal", Dec. 1, 1975.

"Hydrodesulfurization of Catalytic Cracked Gasoline", S. Hatanaka and M. Yamada, "Industrial & Engineering Chemistry Research", vol. 36, No. 5, pp. 1519–1523 (1997).

"Hydrodesulfurization of Catalytic Cracked Gasoline", S. Hatanaka and M. Yamada, "Industrial & Engineering Chemistry Research", vol. 36, No. 12, pp. 5110–5117 (1997).

"Hydrodesulfurization of Catalytic Cracked Gasoline", S. Hatanaka and M. Yamada, "Industrial & Engineering Chemistry Research", vol. 1 37, No. 5, pp. 1748–1754 (1998).

* cited by examiner

Primary Examiner—Walter D. Griffin
(74) Attorney, Agent, or Firm—Paul & Paul

(57) ABSTRACT

A hydrogenation region in a fixed bed reactor is defined with a first, a second and a third hydrogenation zones sequentially from the entrance of the reactor, and a sulfur-containing diesel gas oil feedstock is passed through the first, second and third hydrogenation zones sequentially under conditions of a temperature of 320 to 420° C., a pressure of 5 to 15 MPa, an LHSV of 0.5 to 3 h$^{-1}$ and a hydrogen/oil ratio of 1000 to 5000 scfb, wherein (a) a catalyst consisting essentially of cobalt and molybdenum on a porous carrier containing alumina as a main ingredient is loaded in the first hydrogenation zone in an amount of 20 to 60 vol %, (b) a catalyst consisting essentially of nickel and tungsten on a porous carrier containing 85 to 99 wt % of alumina or amorphous silica-alumina and 1 to 15 wt % of zeolite is loaded in the second hydrogenation zone in an amount of 20 to 60 vol % and (c) a catalyst consisting essentially of cobalt and/or nickel and molybdenum on a porous carrier containing alumina as a main ingredient is loaded in the third hydrogenation zone in an amount of 10 to 30 vol %.

24 Claims, No Drawings

PROCESS AND APPARATUS FOR HYDRODESULFURIZATION OF DIESEL GAS OIL

BACKGROUND OF THE INVENTION

1. Field of the Invention

The present inventions relate to a process, by a combination of specific steps and a specific catalyst at a specific ratio, for hydrodesulfurization of a sulfur-containing gas oil with a boiling point of 220 to 380° C. and an apparatus useful therefor.

2. Description of the Related Art

The straight run diesel gas oil obtained by distilling crude oil or the decomposition diesel gas oil obtained by decomposing heavy oil contains sulfur compounds, and the amount is in a range of 1 to 3 wt % as sulfur. When the diesel gas oil containing sulfur compounds is used as a diesel fuel, sulfur compounds will be exhausted in atmosphere as $SO_x$ and the environment will be polluted.

Therefore, these diesel gas oils are used as a fuel usually after being dehydrosulfurized to remove sulfur compounds. It is stated that the permissible value for amount of sulfur included in a diesel fuel is 0.05 wt % or less in JIS (Japanese Industrial Standard), and large-scale desulfurization arrangements have been constructed to achieve this value and are used. In addition, it is said that it is necessary to further decrease the amount of sulfur with a view to installing a purification catalyst, which reduces NOx in the automotive exhaust gas, into a diesel car in the future and using a part of the automotive exhaust gas again by circulating as a part of a diesel gas. This system is called an EGR system (EGR: Exhaust Gas Recirculation).

A catalyst, which consists essentially of cobalt or nickel, and molybdenum supported on an alumina carrier, has conventionally been used for the desulfurization of diesel gas oil so far. However, conventional catalysts have problems in that they can hardly desulfurize 4-methyldibenzothiophene and 4,6-dimethyldibenzothiophene, and therefore, in order to lower the sulfur content of the light oil product to the level of 0.05 wt % or less, it is necessary to raise the reaction temperature and the reaction pressure to a very high level, so that the construction cost of the arrangement, and the running costs, increase.

As for a process for improving the desulfurization activity for sulfur compounds to be hardly desulfurized, a catalyst whose carrier contains phosphorous and boron was reported in Japanese Unexamined Patent Publication (Kokai) No. 52-13503, and a catalyst to whose carrier zeolite was added was reported in Japanese Unexamined Patent Publication (Kokai) No. 7-197039. These catalysts have Brønsted acid sites and, thus, exhibit a high ability to isomerize a methyl group of dimethyldibenzothiophene and to hydrogenate a phenyl group, and high activity to desulfurize 4-methyldibenzothiophene and 4,6-dimethyldibenzothiophene.

However, the catalysts whose carriers contain phosphorous, boron or zeolite have drawbacks in that their desulfurization activities for alkylbenzothiophenes and dibenzothiophenes without 4- or 6-alkyl substituent, such as dibenzothiophene, and 1-, 2- or 3-methyldibenzothiophene are inferior to those of conventional catalysts consisting essentially of cobalt and molybdenum on an alumina carrier (F. van Looij et al. Applied Catalysis A: General 170, 1–12 (1998)). Moreover, said catalysts have further drawbacks in that, as they have Brønsted acid sites, they may easily cause a coloring of the eight oil product and, when they are used for an olefin-containing feedstock oil or are used at a high temperature of 350° C. or higher, thiols and sulfides are occasionally generated to decrease the desulfurization ratio. In addition, they have another problem in that olefin elements in a feedstock may be polymerized at Brønsted acid sites to generate coke and the deactivation of catalyst may be accelerated. Even if olefins were not included in a feedstock, if sulfur compounds were desulfurized with said catalysts, olefins would be generated in situ, and it would cause an extraction of coke. This can be understood from the view that a coking speed when thiophene flows into said catalyst reaches ten times the coking speed reached when olefins or aromatic compounds flow into the catalyst (Catalysis Review, 24, (3), 343 (1982)).

It is difficult to desulfurize the sulfur compounds to a level of 0.05 wt % or less as sulfur even if any above-mentioned catalyst was used and studies have been carried out to deeply desulfurize a diesel gas oil from an aspect of process or reaction apparatus. For example, a process, containing two different steps processed under different reaction condition, which can deeply desufurize a diesel gas oil without any worsening of hue is proposed in Japanese Unexamined Patent Publication (Kokai) No. 7-102266. A deep hydrodesulfurization process, where a diesel gas oil is separated by distillation into a light fraction to be easily desulfurized and a heavy fraction to be hardly desulfurized and then those fractions after hydrodesulfurized individually are mixed into a deep desulfurized diesel gas oil product, is proposed in Japanese Unexamined Patent Publication (Kokai) No. 5-311179. However, said deep hydrodesulfurization process containing 2 different steps under different reaction conditions, which can desulfurize a diesel gas oil deeply without any worsening of hue, has an effect to improve a diesel gas oil hue but can hardly improve a further deep desulfurization. Said deep hydrodesulfurization process, where a gas oil feedstock is separated by distillation into a light fraction to be easily desulfurized and a heavy fraction to be hardly desulfurized and then those fractions after individually hydrodesulfurized are mixed into a deep desulfurized diesel gas oil product, has many problems in that a high reaction temperature and a high reaction pressure are needed for a heavy fraction to be hardly desulfurized.

Thus, these prior arts have many problems and they do not achieve an effective manufacturing of excellent diesel gas oil with low sulfur content when used for deep hydrodesulfurization of diesel gas oil as they are.

BRIEF SUMMARY OF THE INVENTION

It is an object of the present invention to provide a process and an apparatus for solving the above-mentioned problems and for effectively producing a diesel gas oil product with an extremely low sulfur content, good hue and excellent performance.

It is another object of the present invention to provide a process and an apparatus for producing diesel gas oil by simple means without special equipment and severe hydrodesulfurization conditions, such as high temperature and pressure, while the generation of coke can be regulated and the catalyst activity can be prolonged.

After intensive research to solve the above-mentioned problems, the present inventors have found a process and an apparatus, for the deep desulfurization of sulfur-containing diesel gas oil, which comprises a specific combination of hydrogenation steps with the use of specific catalysts at a specific ratio and have finally completed the present invention.

The present invention provides an apparatus for the hydrodesulfurization of sulfur-containing diesel gas oil comprising:

(1) a hydrogenation region in a reactor defined with a first hydrogenation zone, a second hydrogenation zone, and a third hydrogenation zone sequentially from the entrance of the reactor;

(2) a catalyst consisting essentially of cobalt and molybdenum supported on a porous carrier containing alumina as a main ingredient loaded in said first hydrogenation zone in an amount of 20 to 60 vol % based on the total volume of the catalysts used in the first to third hydrogenation zones, (3) a catalyst consisting essentially of nickel and tungsten supported on a porous carrier containing 85 to 99 wt % of alumina or amorphous silica-almina and 1 to 15 wt % of zeolite loaded in said second hydrogenation zone in an amount of 20 to 60 vol % based on the total volume of said catalysts and (4) a catalyst consisting essentially of cobalt and/or nickel and molybdenum supported on a porous carrier containing alumina as a main ingredient loaded in said third hydrogenation zone in an amount of 10 to 30 vol % based on the total volume of said catalysts.

A catalyst for the present invention may be a catalyst with a carrier selected from the group of porous inorganic material such as silica, alumina, magnesia, titania, silica-alumina, alumina-zirconia, alumina-titania, alumina-boria, alumina-chromia, silica-alumina-magnesia, silica-alumina-zirconia, and its active metal component may be selected from the group of the metals of GROUP VIII, consisting of cobalt, nickel, iron, rhodium, palladium, platinums etc., and of GROUP VI consisting of molybdenum, tungsten, chromium and others or a combination thereof. By the process of the present invention, well-known hydrodesulfurization catalysts, for example, catalyst where cobalt and/or nickel and molybdenum or tungsten are supported on the porous carrier, instead of expensive or specific catalysts, may be used effectively. Preferably, for the catalyst in the first hydrogenation zone, it is advantageous to use the catalyst where cobalt and molybdenum are supported on a porous carrier containing alumina as principal ingredient (it may contain alumina at 95–100 wt % as the principal ingredient, with other ingredient of up to 5 wt %, such as phosphorus, magnesium, and calcium). Said catalysts show the desulfurization activity to alkylbenzothiophenes and dibenzothiophenes with no alkyl group on 4- or 6-site and these catalysts can desulfurize them more effectively than the other catalysts. Additionally, said catalysts are the most excellent, because they can also desulfurize 90 wt % or more of 4-methyldibenzothiophene and 4,6-dimethyldibenzothiophene, which are difficult to desulfurize, although the activity of desulfurization for them is not so high. Therefore, as the catalyst used in the first hydrogenation zone, the catalyst of Co-Mo supported on a porous carrier containing aluminum as a main ingredient in an amount of 20 to 60 vol % based on the total volume of the catalyst used in the first to the third zones is the most suitable.

The present invention provides a process for the hydrodesulfurization of sulfur-containing diesel gas oil comprising the steps of:

(1) defining a hydrogenation region in a reactor with a first hydrogenation zone, a second hydrogenation zone and a third hydrogenation zone sequentially from the entrance of the reactor, and (2) passing the sulfur-containing diesel gas oil feedstock with a boiling point of 220 to 380° C. through said first, said second and said third hydrogenation zones sequentially to hydrodesulfurize under conditions of a temperature of 320 to 420° C., a pressure of 5 to 15 MPa, an LHSV of 0.5 to 3 $h^{-1}$, and a hydrogen/oil ratio of 1000 to 5000 scfb, wherein, (a) a catalyst consisting essentially of cobalt and molybdenum supported on a porous carrier containing alumina as a main ingredient is loaded in the first hydrogenation zone in an amount of 20 to 60 vol % based on the total volume of the catalysts used in the first to third hydrogenation zones, (b) a catalyst consisting essentially of nickel and tungsten supported on a porous carrier containing 85 to 99 wt % of alumina or amorphous silica-alumina and 1 to 15 wt % of zeolite is loaded in the second hydrogenation zone in an amount of 20 to 60 vol % based on the total volume of said catalysts and (c) a catalyst consisting essentially of cobalt and/or nickel and molybdenum supported on a porous carrier containing alumina as a main ingredient is loaded in the third hydrogenation zone in an amount of 10 to 30 vol % based on the total volume of said catalysts.

In addition, in said first hydrogenation zone, nickel instead of cobalt may be used, however cobalt is preferable because it has a excellent desulfurization activity to alkylbenzothiophenes and dibenzothiophenes with no alkyl group on 4- or 6-site such as dibenzothiophene, 1-, 2- or 3-methyldibenzothiophene.

Further, the present invention provides a process for the hydrodesulfurization of sulfur-containing diesel gas oil comprising passing the sulfur-containing diesel gas oil feedstock through the first, the second and the third hydrogenation zones sequentially to hydrodesulfurize under conditions of a temperature of 320 to 370° C., a pressure of 10 to 15 MPa, an LHSV of 0.5 to 2 $h^{-1}$, and a hydrogen/oil ratio of 1000 to 5000 scfb and recovering a light oil product containing 0.005 wt % or less with a hue of a Saybolt color of +20 or higher.

DESCRIPTION OF THE PREFERRED EMBODIMENTS

The inventions will be described in detail by illustrating the embodiments and the effects thereof. The present inventors have studied the above-mentioned problems in the conventional techniques, researched and testified various methods, components of the systems, etc. As a result, they found that a most important key point for effective production of desulfurized diesel gas oil with desired excellent properties was to achieve nearly complete hydrodesulfurization, prior to other steps, of alkylbenzothiophenes and dibenzothiophenes with no alkyl group on 4- or 6-position among sulfur-containing compounds in a diesel gas oil feedstock and that, by doing so, an expensive and special catalyst or severe hydrodesulfurization conditions would not be necessarily demanded in the following steps. They also obtained the finding that it was important to effectively hydrodesulfurize 4-methyldibenzothiophene and 4,6-dimethyldibenzothiophene and then to hydrodesulfurize thiols and sulfides which caused coloring of a diesel gas oil product. Based on the finding, a process and an apparatus according to the present invention were developed to regulate a specific combination of specific catalysts to demonstrate the effect to its maximum and hydrodesulfurization conditions to utilize most effectively the ability of said catalyst.

The catalyst in each hydrogenation zone and their roles are as follows. First, a catalyst consisting essentially of cobalt and molybdenum supported on a porous carrier containing alumina as a main ingredient may be loaded in the first zone in an amount of 20 to 60 vol % based on the total volume of the catalysts used in the first to third hydrogenation zones. This catalyst shows high desulfurization activity to sulfur compounds other than 4-methyldibenzothiophene or 4,6-dimethyldibenzothiophenes, that is, dibenzothiophene and 1-, 2- or 3-methyldibenzothiophenes and other sulfur compounds in the diesel gas oil. It is desirable that the filling ratio of this catalyst in the first hydrogenation zone to the total volume of catalysts in the first to third zones is set so that 70–95 mole % of sulfur compounds other than 4-methyldibenzothiophene or 4,6-dimethyldibenzothiophene can be desulfurized there. If the catalyst ratio in the first hydrogenation zone is small, not only the desulfurization efficiency will worsen but also the deterioration speed of the catalyst in the second hydrogenation zone by coking will grow and it is undesirable. In case that said catalyst ratio of the first hydrogenation zone is too large, the ratio of catalyst used in the second hydrogenation zone, which consists essentially of nickel and tungsten supported on a carrier containing 85 to 99 wt % of alumina or amorphous silica-alumina and 1 to 15 wt % of zeolite will decrease. Because of it, the desulfurization of 4-methyldibenzothiophene or 4,6-dimethyldibenzothiophene will be hardly advanced and therefore the deep desulfurization will not be carried out.

In a second hydrogenation zone, a catalyst consisting essentially of nickel and tungsten supported on a porous carrier containing 85 to 99 wt % of alumina or amorphous silica-alumina and 1 to 15 wt % of zeolite may be used in an amount of 20 to 60 vol % based on said total volume of catalysts. This catalyst shows a high desulfurization activity for 4-methyldibenzothiophene and 4,6-dimethyldibenzothiophene that can hardly be desulfurizated in the first hydrogenation zone. The by-products of thiols and sulfides are generated in the second hydrogenation zone. Moreover, the light oil product occasionally colors a small amount according to reactive conditions. A nickel- or tungsten-supporting catalyst has a high hydrogenation ability, therefore it may hydrogenate a phenyl group on dibenzothiophene and let 4-methyldibenzothiophene and 4,6-dimethyldibenzothiophene easily desulfurized. As this catalyst has a high hydrogenative decomposition activity, a naphtha fraction and a kerosene fraction may be generated. These fractions are high value-added fractions and there would not occur any economical loss.

In a third hydrogenation zone, a catalyst consisting essentially of cobalt and/or nickel and molybdenum supported on a porous carrier containing alumina as a main ingredient may be used in an amount of 10 to 30 vol % based on the total volume of said catalysts. In the third hydrogenation zone, the desulfurization for thiol-by-product or sulfide-by-product generated in the second hydrogenation zone and the post treatment of coloring compounds will be carried out. It has been reported that thiols and sulfides might be generated as sub-products even under high-pressure condition and it should be essential to desulfurize these compounds for a promotion of desulfurization ratio (D. P. Satchell et al. Oil and Gas Journal, 123, Dec. 1, (1975)).

Thus, the process and the apparatus for obtaining high desulfurization ratio, in which the best catalyst for each hydrogenation zone is to be arranged corresponding to the purpose, have been discovered after the present inventors researched mechanisms of desulfurization and examined precisely the characters of catalysts. These are the inventions based on a very new idea.

Moreover, a filling ratio of the catalyst in each zone can be decided upon a volume ratio stated by the present invention on considering a composition of sulfur compounds in a gas oil feed stock and a sulfur content aimed for the product.

The ratio, based on the total catalyst volume, may be from 20 to 60 volume % for a catalyst in the first hydrogenation zone, from 20 to 60 volume % for a catalyst in the second hydrogenation zone and from 10 to 30 volume % for a catalyst in the third hydrogenation zone. More preferably the ratio may be from 30 to 50 volume % for a catalyst in the first hydrogenation zone, from 40 to 60 volume % for a catalyst in the second hydrogenation zone and from 10 to 20 volume % for a catalyst in the third hydrogenation zone.

An active metal content contained in a conventional desulfurization catalyst for usual light oil can be adopted as a active metal content contained in the catalyst of the first and the second hydronenation zones used for the present invention. That is, Co or Ni active metal (calculated as CoO or NiO) may be in a range of 1 to 10 weight parts, based on 100 parts of total carriers in the first or third zones, preferably in a range of 3 to 6 weight parts. Mo active metal (calculated as $MoO_3$) may be in a range of 10 to 30 weight parts, based on 100 parts of carrier in the first or third zones, preferably in a range of 15 to 25 weight parts. As for the metal content, when it is low, as the activity will be insufficient, the deactivation kinetics of the catalyst will grow. On the other hand, if too much, as the activity will saturate, it will be uneconomical. As for a ratio of Co or Ni to Mo, the ratio by which the maximum desulfurization activity can be obtained may be adopted. However, preferably a weight ratio of a $MoO_3$/CoO or $MoO_3$/NiO may be in a range of 2.5 to 4.5:1, more preferably of 3.0 to 4.0:1.

The present invention has such characteristic that a porous carrier containing 85 to 99 wt % of alumina or amorphous silica-alumina and 1 to 15 wt % of zeolite is used in the second hydrogenation zone. And as the zeolite, A-type zeolite, X-type zeolite, Y-type zeolite, L-type zeolite, MFI-type zeolite, and mordenite etc. may be used. Above all, USY-type zeolite made by dealminating Y-type zeolite to improve the heat stability may be used most desirably. These zeolites may be ion-exchanged to generate Brønsted acid sites. That may also be ion-exchanged by protons, an alkaline earth metal, a rare earth metal, etc.

The zeolite can be followed by calcination, after being molded, by being mixed with a gel of alumina, and can be put on a molded alumina carrier with a binder. As for a nickel or tungsten content supported on a carrier, Ni content (calculated as NiO) may be in a range of 1 to 10 weight parts based on 100 weight parts of carrier including zeolite or potassium weight, preferably in a range of 3 to 6 weight parts. The W content (calculated as NiO or $WO_3$) may be in a range of 5 to 30 weight parts on the same base as mentioned-above, preferably in a range of 10 to 25 weight parts.

A catalyst containing a small amount of various reforming elements for improvement of the desulfurization activity etc. can be used as a catalyst in each hydrogenation zone. For instance, it is possibly effective to add phosphorous to the catalyst in the second hydrogenation zone, because it can improve the dispersibility of active metals and increase the Brønsted acid sites to improve the desulfurization activity to 4-methyldibenzothiophene and 4,6-dimethylbenzothiophene. However, as it may occasionally result in a cause of the products coloring, it is desirable to prepare a measure to solve it. On the other hand, it may be possibly effective to add potassium or magnesium to a catalyst in the third hydrogenation zone, because it can decrease the Brønsted sites and regulate the generation of thiols and sulfides which cause a coloring of the product.

A gas oil applicable to the present invention is a gas oil fraction with a boiling point in a range of 220 to 380° C. such as a straight run gas oil, a catalytic cracking gas oil, and a pyrolysis gas oil. Gas oil hydrogenated once with other arrangements can be deeply desulfurized by the process according to the present invention. Though the present invention may be effective also in the desulfurization of vacuum gas oil with higher boiling point, it is difficult to apply a process of the present invention to the desulfurization of an atmospheric residue which contains a large amount of heavy component, because the deactivation of catalyst in the second hydrogenation zone becomes remarkable.

A permissible sulfur content included in a diesel gas oil feedstock applicable to the present invention is not especially limited, and the content in usual straight-run gas oil is about 1 to 2 weight %. The sulfur content in the diesel gas oil product can be decided arbitrarily if necessary, and a desulfurization ratio needed can be achieved by the optimization of reactive conditions of reaction temperature, pressure, and liquid hourly space velocity (LHSV), hydrogen/oil ratio etc.

A diesel gas oil product desulfurized by the present invention can be used as a regular or a premium diesel fuel for a diesel car. It is natural to be able to mix a lubricant improver, a cetane number improver, and a desiccating agent with the desulfurized gas oil if necessary. Moreover, it is possible to use the desulfurized oil by mixing it with an A-type heavy oil or other oil.

Desulfurization conditions for a usual gas oil can be adopted as reactive conditions for the process of the present invention. That is, the conditions can be set from 320 to 420° C. in temperature, from 5 to 15 MPa in pressure, from 0.5 to 3 $h^{-1}$ in LHSV and from 1000 to 5000 scfb in hydrogen/oil ratio according to the target desulfurization ratio. Even in case of adopting the usual desulfurization conditions, the possible achievement of a high desulfurization ratio is one of main characteristics of this invention. To achieve ultra-deep sulfurization ratio, that is 0.005 weight % of sulfur content in a diesel gas oil product, the conditions of 330 to 400° C. in temperature, 7 to 15 MPa in pressure, 0.5 to 1 $h^{-1}$ in LHSV and 1000 to 5000 scfb in hydrogen/oil ratio may be the best conditions.

In addition, the present invention can provide a full performance in desulfurization even at a high pressure. Therefore, when the gas oil fraction feedstock of sulfur-containing hydrocarbon petroleum is passed to be desufurized, through the first hydrogenation zone, the second hydrogenation zone and the third hydrogenation zone sequentially under conditions of a high pressure of 10 to 15 MPa, a temperature of 320 to 370° C., an LHSV of 0.5 to 2 $h^{-1}$, a hydrogen/oil ratio of 1000 to 5000 scfb, a diesel gas oil having excellent properties and low pollution, such as a sulfur content of 0.0001 to 0.005 wt % and a hue of a Saybolt color of +20 to +25, will be obtained as a diesel gas oil product. Further, by selecting specific conditions, it may be possible to produce a low public-polluting diesel gas oil product with excellent properties, including sulfur content of 0.0001 or less and an improved Saybolt color of very close to +30. Pressure ranges used in prior arts have been about 3 to 7 MPa so far, while the present invention can provide excellent performances even under a higher pressure. Thus, a reaction can be advanced even at a lower temperature than that used in prior arts due to a high pressure of 10 to 15 MPa. It also is possible to make a hydrogenation reaction of aromatic hydrocarbons in a raw gas oil fraction progress advantageously in a thermodynamic equilibrium. Therefore, a content ratio of aromatic hydrocarbons in a product obtained by the present invention is much lower than those obtained by the prior arts and the diesel gas oil product that exhausts less dark smoke when it being used as a diesel fuel can be obtained. Thus, the present invention, as it can be used even under high pressure, is apparently different from above-mentioned prior arts. The differences can be clearly recognized by the fact that the sulfur content of diesel gas oil product obtained by the present invention is 0.005 wt %, the hue thereof is excellent and the Saybolt color thereof is +20 or higher, while the sulfur content by the prior arts is 0.05 wt %.

A reactor used for the present invention may be a reactor of any known type. For instance, both of a fixed bed type reactor and a moving bed type reactor or both of a down flow type reactor and an improvement flow type reactor may be acceptable. The most suitable among them is a fixed bed down flow type reactor. This is a reactor type normally used to desulfurize the gas oil, and conventional arrangements can be used as they are. It is not especially needed to provide an independent bed of catalyst for each hydrogenation zone. Though a single reactor divided into plural beds may be applicable generally, plural reactors can be used if necessary. Because there occurs a so-called trickle bed state in which a liquid coexists with a gas under the conditions for deep desulfurization, it is preferable to set up the distributor over each catalyst bed so that the distributor can uniformly distribute a liquid. Moreover, a quenching hydrogen gas may be introduced into a best location according to a heat condition and the heat can be controlled thereby. Hydrogen gas can be used by recycling after an absorption removal of hydrogen sulfides done by an amine solution. For an actual arrangement, a molded catalyst may be used, and a catalyst may be loaded in sock or dense in a reactor by a conventional process. After said catalyst is presulfided in situ, a heated diesel gas oil feedstock with hydrogen can be passed into the reactor loaded with said catalyst. A used catalyst may be used repeatedly after the usual baking for reproduction.

The embodiments according to the present inventions will be explained here more in detail according to the examples of the present inventions.

EXAMPLE 1

A 1 inch inside diameter reaction tube was divided into a first hydrogenation zone, a second hydrogenation zone, and a third hydrogenation zone sequentially from upstream to downstream. In the first zone, 80 mL of a catalyst, where 4 wt parts of cobalt (as CoO conversion) and 22 wt parts of molybdenum (as $MoO_3$ conversion) based on 100 wt parts of γ-alumina carrier was supported on a γ-alumina carrier, was loaded, in the second zone, 80 mL of a catalyst, where 4 wt parts of nickel (as NiO conversion) and 20 wt parts of tungsten (as $WO_3$ conversion) were supported on a carrier containing 90 wt % of amorphous silica-alumina and 10 wt % of proton-exchanged USY-type zeolite, was loaded and, in the third zone, 40 mL of a catalyst, where 4 wt parts of nickel (as NiO conversion) and 20 wt parts of molybdenum (as $MoO_3$ conversion) were supported on a γ-alumina carrier, was loaded. After these catalysts in the reactor were presulfided by a straight run kerosene containing dimethyldisulfide (sulfur content of 3 wt %) under conditions of 300° C., 7 MPa, LHSV 2 h$^{-1}$, hydrogen/oil ratio 1000 scfb for 4 hours, Middle East straight run gas oil (boiling point; in a range of 228 to 371° C., sulfur content; 1.53 wt %) was passed into said catalyst to be desulfurized under conditions of 350° C., 7 MPa, LHSV 2 h$^{-1}$, and hydrogen/oil ratio 2000 scfb. The sulfur content of generation oil (a diesel gas oil product) was 0.024 wt % and the hue was a Saybolt color (JIS K-2580) of +18.

EXAMPLE 2

In the same reaction tube as used in Example 1, the same catalysts as used in the first and the second hydrogenation zones of the reactor in Example 1 were loaded in a first and a second hydrogenation zone in this amount respectively and 20 mL of a catalyst where 4.5 weight parts of cobalt (as Coo conversion) and 20 weight parts of molybdenum (as MoO$_3$ conversion) were supported on a γ-alumina carrier containing 1 wt % of potassium was loaded in a third hydrogenation zone. These catalysts in the reactor were presulfided in the same way as used in Example 1 and the same gas oil feedstock as used in Example 1 was desulfurized under the same conditions as described in Example 1. The sulfur content of generation oil was 0.023 wt % and the hue was a Saybolt Color of +20.

EXAMPLE 3

In the same reaction tube as used in Example 1, the same catalysts as used in Example 1 were loaded in the same amounts. These catalysts in the reactor were presulfided by the same way as described in Example 1. Then the same gas oil feedstock as used in Example 1 was passed into said catalyst to be desulfurized under conditions of 360° C., 12 MPa, LHSV 0.8 h$^{-1}$, and hydrogen/oil ratio 2000 scfb. The sulfur content of generation oil was 0.003 wt % and the hue was a Saybolt color of +23.

EXAMPLE 4

80 vol % of Middle East straight run gas oil (boiling point; 228 to 371° C., sulfur content; 1.53 wt %) and 10 vol % of catalytic cracking gas oil (boiling point; 212 to 345° C., sulfur content; 0.23 wt %), 10 vol % of gas oil from residual desulfurization unit (boiling point; 181 to 346° C., sulfur extent; 0.08 wt %) were mixed. This mixed gas oil was passed into the same catalysts in the reactor as used in Example 1 and desulfurized at 350° C. in temperature, 5 MPa in pressure, 2 h$^{-1}$ in LHSV, and 2000 scfb in hydrogen/oil ratio. The sulfur content of generation oil was 0.033 wt % and the hue was a Saybolt color of +14. After this experiment was continued for 30 days, the sulfur content of generation oil was 0.036 wt % and the hue was a Saybolt color of +15.

Comparative Example 1

In the same reaction tube as used in Example 1, a catalyst, where 3 weight parts of nickel (as NiO conversion) and 20 weight parts of molybdenum (as MoO$_3$ conversion) were supported on a carrier which contained 97 wt % of γ-alumina and 3 wt % of proton-exchanged USY-type zeolite, was loaded in 200 mL. After this catalyst was presulfided in the same way as described in Example 1, the same gas oil feedstock as used in Example 1 was desulfurized under the same conditions as described in Example 1. The sulfur content of generation oil was 0.029 wt % and the hue was a Saybolt color of –2.

Comparative Example 2

In the same reaction tube as used in Example 1, a catalyst, where 4 weight parts of cobalt (as CoO conversion) and 22 weight parts of molybdenum (as MoO$_3$ conversion) based on 100 wt parts of γ-alumina carrier were supported on a γ-alumina carrier, was loaded in 200 mL. After this catalyst was presulfided by the same way as described in Example 1, the same gas oil feedstock as used in Example 1 was desulfurized under the same condition as described in Example 1. The sulfur content of generation oil was 0.031 wt % and the hue was a Saybolt color of +18.

Comparative Example 3

The same mixture gas oil as used in Example 4 was passed into the same catalyst used in Comparative Example 2 to be desulfurized. The reactive conditions were the same as described in Example 3. The sulfur content of the generated oil was 0.061 wt % and the hue was a Saybolt color of –8. After this experiment was continued for 30 days, the sulfur content of generation oil was 0.041 wt % and the hue was a Saybolt color of –12.

In case that the hydrodesulfurization of petroleum hydrocarbon gas oil fraction containing sulfur is done by the present invention, not only can a high desulfurization ratio be obtained, but also a long-term stable catalytic activity can be obtained, because the generation of coke can be controlled.

While preferred embodiments of the inventions have been described using specific terms, such a description is for illustrative purpose only, and it is to be understood that changes and variations may be made without departing from the spirit or scope of the following claims.

What is claimed is:

1. An apparatus for the hydrodesulfurization of sulfur-containing diesel gas oil comprising:
   (1) a hydrogenation region in a reactor with a first hydrogenation zone, a second hydrogenation zone and a third hydrogenation zone defined sequentially from the upstream of the sulfur-containing gas oil feedstock flow;
   (2) a catalyst consisting essentially of cobalt and molybdenum supported on a porous carrier containing alumina as a main ingredient loaded in said first hydrogenation zone in an amount of 20 to 60 vol % based on the total volume of catalysts used in said first, second and third hydrogenation zones;
   (3) a catalyst consisting essentially of nickel and tungsten supported on a porous carrier containing 85 to 99 wt % of an alumina or an amorphous silica-alumina and 15 to 1 wt % of zeolite loaded in said second hydrogenation zone in an amount of 20 to 60 vol % based on the total volume of said catalysts; and
   (4) a catalyst consisting essentially of cobalt and/or nickel and molybdenum supported on a porous carrier containing alumina as a main ingredient loaded in said third hydrogenation zone in an amount of 10 to 30 vol % based on the total volume of said catalysts.

2. An apparatus according to claim 1, wherein an amount of said catalyst in said first hydrogenation zone is in a range of 30 to 50 vol %, an amount of said catalyst in said second hydrogenation zone is in a range of 40 to 60 vol %, and an amount of said catalyst in said third hydrogenation zone is in a range of 10 to 20 vol % based on the total volume of said catalysts.

3. An apparatus according to claim 1, wherein phosphorus is added to said catalyst in said second hydrogenation zone.

4. An apparatus according to claim 1, wherein K and/or Mg is added to said catalyst in said third hydrogenation zone.

5. An apparatus according to claim 1, wherein phosphorus is added to said catalyst in said second hydrogenation zone and K and/or Mg is added to said catalyst in said third hydrogenation zone.

6. An apparatus according to claim 1, wherein an amount of cobalt is in a range of 1 to 10 wt parts and an amount of molybdenum is in a range of 10 to 30 wt parts, based on 100 wt parts of said carrier in said first hydrogenation zone, an amount of nickel is in a range of 1 to 10 wt parts and an amount of tungsten is in a range of 5 to 30 wt parts, based on 100 wt parts of said carrier in said second hydrogenation zone, and an amount of cobalt and an amount of nickel are independently in a range of 1 to 10 wt parts and an amount of molybdenum is in a range of 10 to 30 wt parts, based on 100 wt parts of said carrier in said third hydrogenation zone.

7. An apparatus according to claim 1, wherein a weight ratio of $MoO_3/CoO$ or $MoO_3/NiO$ is in a range of 2.5 to 4.5.

8. An apparatus according to claim 1, wherein said reactor is selected from a combination of a fixed bed reactor or a moving bed reactor and a down flow reactor or an improvement flow reactor.

9. An apparatus according to claim 1, wherein said reactor is a fixed bed down flow reactor.

10. An apparatus according to claim 1, wherein said zeolite in said second zone is selected from a group of zeolite-USY, zeolite-A, zeolite-X, zeolite-Y, zeolite-L, zeolite-MFI and mordenite.

11. An apparatus according to claim 10, wherein said zeolite is ion-exchanged.

12. A process for the hydrodesulfurization of sulfur-containing diesel gas oil comprising the steps of:
   (1) defining a hydrogenation region in a reactor with a first hydrogenation zone, a second hydrogenation zone and a third hydrogenation zone sequentially from the entrance of said reactor; and
   (2) passing a sulfur-containing diesel gas oil feedstock through said first, second and third hydrogenation zones sequentially under conditions of a temperature of 320 to 420° C., a pressure of 5 to 15 MPa, an LHSV of 0.5 to 3 h−1, and a hydrogen/oil ratio of 1000 to 5000 scfb, wherein
      (a) a catalyst consisting essentially of cobalt and molybdenum supported on a porous carrier containing alumina as a main ingredient is loaded in said first hydrogenation zone in an amount of 20 to 60 vol % based on the total volume of catalysts used in said first, second and third hydrogenation zones,
      (b) a catalyst consisting essentially of nickel and tungsten supported on a porous carrier containing 85 to 99 wt % of alumina or amorphous silica-alumina and 15 to 1 wt % of zeolite is loaded in said second hydrogenation zone in an amount of 20 to 60 vol % based on the total volume of said catalysts, and
      (c) a catalyst consisting essentially of c obalt and/or nickel and molybdenum supported on a porous carrier containing alumina as a main ingredient is loaded in said third hydrogenation zone in an amount of 10 to 30 vol % based on the total volume of said catalysts.

13. A process according to claim 12, wherein said sulfur-containing diesel gas oil feedstock is passed through said first, second and third hydrogenation zones sequentially to be hydrodesulfurized under conditions of a temperature of 320 to 370° C., a pressure of 10 to 15 MPa, an LHSV of 0.5 to 2 h$^{-1}$ and a hydrogen/oil ratio of 1000 to 5000 scfb and a hydrodesulfurized diesel gas oil product with a sulfur content of 0.005 wt % or less and a hue of a Saybolt color of +20 or higher is recovered.

14. A process according to claim 12, wherein an amount of said catalyst in said first hydrogenation zone is in a range of 30 to 50 vol %, an amount of said catalyst in said second hydrogenation zone is in a range of 40 to 60 vol %, and an amount of said catalyst in said third hydrogenation zone is in a range of 10 to 20 vol % based on the total volume of said catalysts.

15. A process according to claim 12, wherein phosphorus is added to said catalyst in said second hydrogenation zone.

16. A process according to claim 12, wherein K and/or Mg is added to said catalyst in said third hydrogenation zone.

17. A process according to claim 12, wherein phosphorus is added to said catalyst in said second hydrogenation zone and K and/or Mg is added to said catalyst in said third hydrogenation zone.

18. A process according to claim 12, wherein an amount of cobalt is in a range of 1 to 10 wt parts and an amount of molybdenum is in a range of 10 to 30 wt parts, based on 100 wt parts of said carrier in said first hydrogenation zone, an amount of nickel is in a range of 1 to 10 wt parts and an amount of tungsten is in a range of 5 to 30 wt parts, based on 100 wt parts of said carrier in said second hydrogenation zone, and an amount of cobalt and an amount of nickel are independently in a range of 1 to 10 wt parts and an amount of molybdenum is in a range of 10 to 30 wt parts, based on 100 wt parts of said carrier in said third hydrogenation zone.

19. A process according to claim 12, wherein a weight ratio of $MoO_3/CoO$ or $MoO_3/NiO$ is in a range of 2.5 to 4.5.

20. A process according to claim 12, wherein said reactor is selected from a combination of a fixed bed reactor or a moving bed reactor and a down flow reactor or an improvement flow reactor.

21. A process according to claim 12, wherein said reactor is a fixed bed down flow reactor.

22. A process according to claim 12, wherein said zeolite in said second zone is selected from a group of zeolite-USY, zeolite-A, zeolite-X, zeolite-Y, zeolite-L, zeolite-MFI and mordenite.

23. A process according to claim 12, wherein said zeolite is ion-exchanged.

24. A process for the hydrodesulfurization of sulfur-containing diesel gas oil comprising the steps of:
   (1) defining a hydrogenation region in a reactor with a first hydrogenation zone, a second hydrogenation zone and a third hydrogenation zone sequentially from the entrance of said reactor; and
   (2) passing a sulfur-containing diesel gas oil feedstock through said first, second and third hydrogenation zones sequentially, wherein
      (a) 70–95 mole % of sulfur compounds, in said sulfur-containing diesel gas oil, other than 4-methyldibenzothiophene or 4,6-dimethyldibenzothiophene are desulfurized in said first hydrogenation zone,
      (b) 4-methyldibenzothiophene and 4,6-dimethyldibenzothiophene are desulfurizated in said second hydrogenation zone, and
      (c) thiols and sulfides are desulfurized and post treatment of coloring compounds are carried out in said third hydrogenation zone.

* * * * *